No Printed Specification Available
V. Brown.
Canal Gate Signal.
9647X
Patented May 14, 1836.
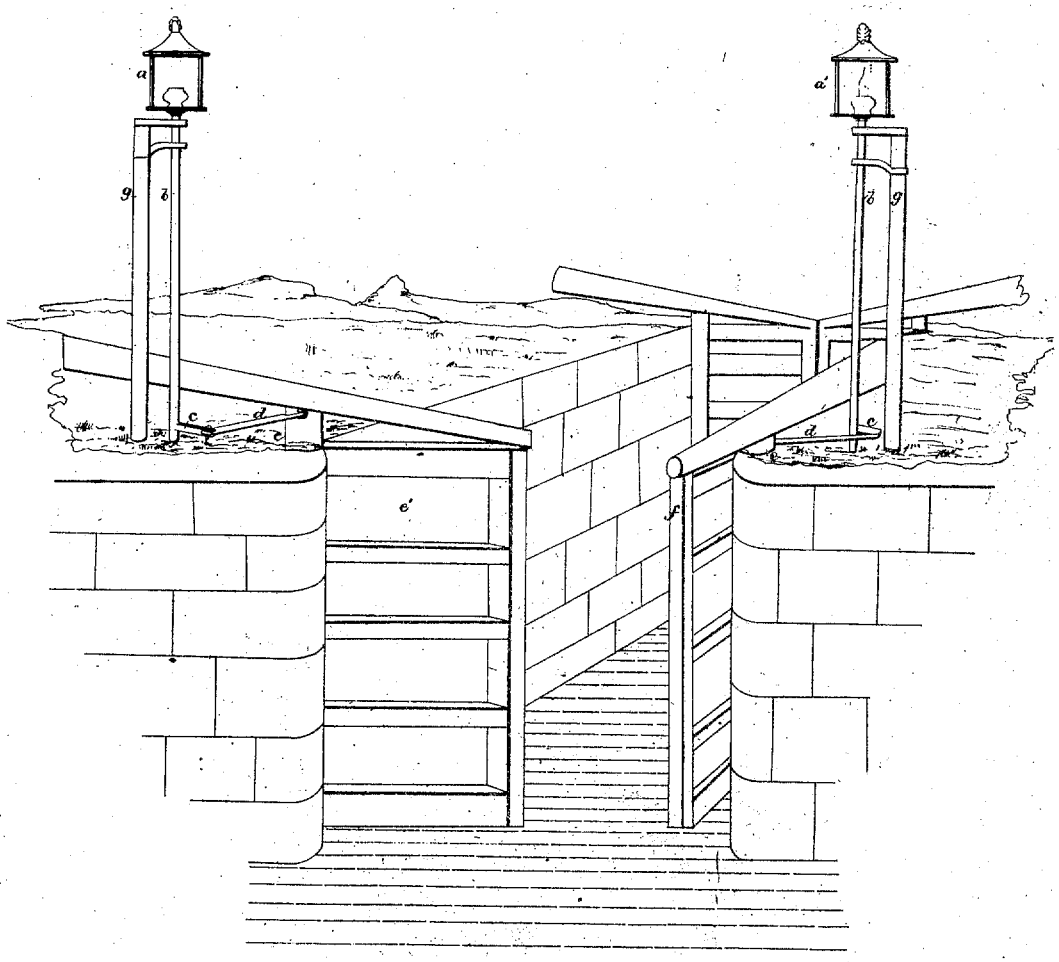

9647X May 14. 1836

Valentine Brown.

Letters Patent.

The Schedule referred to in these Letters Patent and making part of the same, containing a description in the words of the said Valentine Brown himself of his improvement in the Light and other apparatus for indicating to Canal Boats when the gates are open or closed.

---

To all to whom these presents shall come.

Be it Known that I Valentine Brown, of the Town of Clifton Parkin in the County of Saratoga and State of New York have invented a new and useful improvement in the light and other apparatus, for indicating to travellers, or boats, when the gates are open or closed on Canals; and that the following is a full and exact description of the same.

My improvement consists in the use lights or other suitable index to show travellers on board of Canal boats whether the gates are open or closed. The apparatus may consist of a lamp fixed on the top of an upright rod. This rod is allowed to turn horizontally 90 degrees or ¼ of the way round, being supported by means of eyebolts or other suitable fixtures in a lamp post. From the bottom of the upright on which the lamp is placed projects an arm to which is attached a hinge rod; this rod passes horizontally to the fulcrum upright of the gate, having a working connection with it. By means of this hinge rod it is plain to be perceived that, when the gate is opened or closed a different side of the lamp frame or apparatus is presented to the line of the canal. Two lamps and apparatus may be used at each lock. I propose to use a red light to represent the lock open, the natural light when the lock is closed.

I claim the principle by which I indicate that the

333

166. 9647x May 14, 1836 the lock gates are open or closed. I have contemplated different apparatus to produce such indications.

(Witnesses
Matthias Brown
H. Baldwin (Valentine Brown)